US009307015B1

(12) United States Patent
Bauer et al.

(10) Patent No.: US 9,307,015 B1
(45) Date of Patent: Apr. 5, 2016

(54) CLOUD BLACK BOX FOR CLOUD INFRASTRUCTURE

(71) Applicant: EMC Corporation, Hopkinton, MA (US)

(72) Inventors: Andreas L. Bauer, Boxborough, MA (US); Xuan Tang, Hopkinton, MA (US); David Parenti, Westborough, MA (US); Andrew Regan, Sterling, MA (US)

(73) Assignee: EMC Corporation, Hopkinton, MA (US)

( * ) Notice: Subject to any disclaimer, the term of this patent is extended or adjusted under 35 U.S.C. 154(b) by 166 days.

(21) Appl. No.: 14/141,643

(22) Filed: Dec. 27, 2013

(51) Int. Cl.
*H04L 29/08* (2006.01)

(52) U.S. Cl.
CPC .................................... *H04L 67/10* (2013.01)

(58) Field of Classification Search
CPC ......... H04L 67/10; H04L 43/10; H04L 67/16; H04L 43/0823; G06F 21/602; G06F 17/3009
See application file for complete search history.

(56) References Cited

U.S. PATENT DOCUMENTS

| 8,307,219 B2 | 11/2012 | Varadarajan |
| 2013/0290499 A1* | 10/2013 | Radhakrishnan ............. 709/223 |
| 2014/0215057 A1* | 7/2014 | Walsh et al. .................. 709/224 |
| 2014/0368337 A1 | 12/2014 | Venkatachari |

FOREIGN PATENT DOCUMENTS

CN          202956811          5/2013

* cited by examiner

*Primary Examiner* — Kim T Nguyen
(74) *Attorney, Agent, or Firm* — BainwoodHuang

(57) ABSTRACT

A cloud black box (CBB) subsystem in a cloud computing infrastructure includes CBB storage and computer processing circuitry executing a CBB application having first and second operating modes. In a depository mode information messages are continually received from hardware computing devices during normal operation and device information from the messages is stored into the CBB storage. The information messages are generated by CBB agents executing on the hardware computing devices, which continually collect the device information and generate the information messages according to a common information transfer protocol. In a retrieval mode, device information in the CBB storage is provided to a requestor such as a data analysis application, which may be part of or external to the CBB subsystem. The CBB subsystem operates independently and remains available upon failure of hardware or software components in the cloud infrastructure, providing a centralized source of information for diagnosis or other analysis.

20 Claims, 5 Drawing Sheets

CLOUD BLACK BOX FOR CLOUD INFRASTRUCTURE

BACKGROUND

The present invention is related to the field of monitoring operation and logging information for computing devices such as host computers, storage arrays, etc. in a cloud infrastructure.

Cloud infrastructure generally refers to a collection of discrete, heterogeneous computing devices configured and co-operating to provide a computing environment for one or more distributed application programs (applications). The cloud infrastructure may be hosted by a service provider company or organization and thus provide a level of abstraction and separation from a user organization responsible for and making business use of the applications. In one arrangement, a cloud infrastructure includes host computers (hosts), storage arrays, and network switches all interconnected by communications links.

It has been known to perform operation monitoring and information logging in cloud devices. Typically each different type of device includes (or operates with) its own associated logging service, and each logging service may be tailored for the given device type and thus operate and store information in a device-specific manner. Thus, the collection of information for the cloud infrastructure is both heterogeneous (different parts of the data are formatted and organized differently), and is distributed across different devices rather than being centralized.

SUMMARY

The use of separate logging services on different cloud device types has certain shortcomings. There may be no centralized location to obtain all information needed to find single issues and root causes in a cloud infrastructure employing heterogeneous computing devices. The separate logging services may also use different formats and/or have different levels of information, making correlation among different pieces of information difficult or impossible. Additionally, if a logging service is part of or otherwise depends on operation of a monitored device (e.g., a service running on a host that also executes an application for a service provided by the cloud infrastructure), then there is a risk that logged information may not be available when needed—failure of the host makes the local logging service inoperable, making it impossible to get information that is needed for root cause analysis To address the above shortcomings of known systems, a cloud black box subsystem is disclosed that can be used in a cloud computing infrastructure having a set of network-connected hardware computing devices including host computers, storage arrays and network switches, where the host computers execute one or more applications of a cloud infrastructure user, the applications engaging in application data storage accesses with the storage arrays and engaging in application network data transfers via the network switches.

The cloud black box subsystem includes cloud black box storage and computer processing circuitry executing a cloud black box application having first and second operating modes. The first operating mode is a depository mode in which information messages are continually received from the hardware computing devices during normal operation of the cloud computing infrastructure and device information from the information messages is stored into the cloud black box storage. The information messages are generated by respective cloud black box agents executing on the hardware computing devices, continually operative to collect the device information during operation of the respective hardware computing devices and to generate the information messages containing the device information according to a common information transfer protocol. The second operating mode is a retrieval mode in which the device information in the cloud black box storage is provided to a data analysis application.

The use of a cloud black box subsystem and common information transfer protocol overcomes the issues of decentralized and disorganized data. The cloud black box subsystem also operates relatively independently of the applications and hardware computing devices so as to be functional in the retrieval mode in the event of the failure or disruption of any of the applications and hardware computing devices.

The following are specific potential uses and advantages of the disclosed cloud black box subsystem:

Speed of root-cause analysis: all information is in a single place, ready to harvest for root-cause analysis Evidence keeping: Especially when realized as a distinct physical system, there is a single entity that can be isolated to secure collected information (e.g., for evidence purposes)

Addresses lack of a consolidated big data repository, on which various analytic applications can run and help reveal the deep insights that the data captures

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
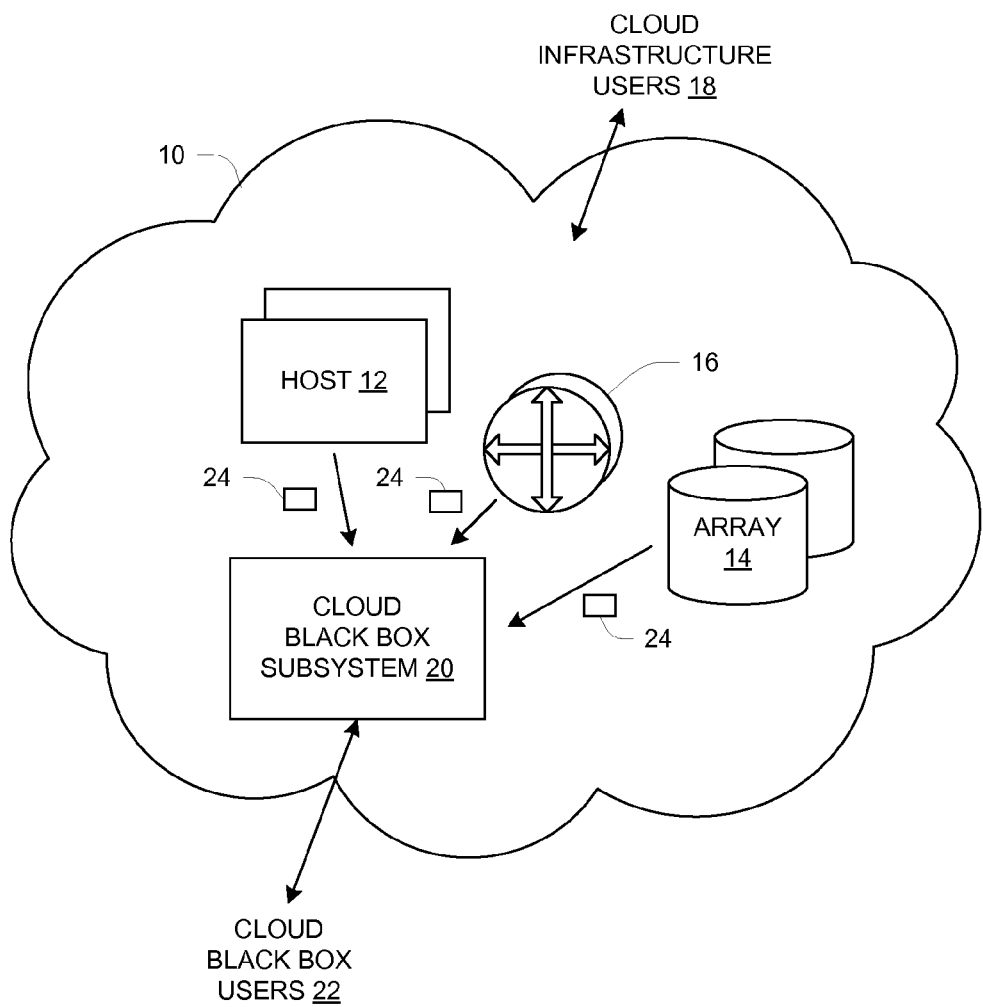
FIG. 1 is a schematic block diagram of a cloud infrastructure including a cloud black box subsystem.

FIG. 1 shows a computing system in the form of a cloud infrastructure 10 having a variety of hardware computing devices including host computers (hosts) 12, data storage subsystems or arrays (array) 14, and network switches 16. The hardware devices are generally interconnected by network communication links such as Ethernet physical-layer links carrying network traffic using a network protocol such as TCP/IP for example (omitted from FIG. 1 for clarity). In operation, the interconnected hardware computing devices serve as computing infrastructure for cloud infrastructure users 18, which may be individuals or organizations. Generally this computing infrastructure supports one or more cloud-based applications used by the users 18, as described more below. One aspect of a cloud infrastructure 10 is the ability of infrastructure users 18 to observe, configure and manage the hardware computing devices as though the devices were in a traditional physical data center of a user organization, such as a corporate data center for example, but also with some desirable form of abstraction and/or decoupling for certain operational benefits. For example, there may be a service component by which a user organization leases physical cloud resources from a cloud infrastructure provider, which is a model that can provide economic and operational benefits to both parties. More generally, the cloud infrastructure 10 is a collection of heterogeneous, discrete components that work together in support of a higher level service. In the example of FIG. 1, these are primarily hardware components, but as described below the techniques herein may be used with other types of components including software components that make up a cloud infrastructure.

Associated with the cloud infrastructure 10 is a cloud black box subsystem 20. In FIG. 1 this is shown as part of the cloud infrastructure 10, but in other arrangements it may be more separated from it. The cloud black box subsystem 20 continually collects various device information generated and provided by the hardware computing devices 12, 14 and 16 and stores this device information in cloud black box storage, described more below. As shown, the devices 12, 14 and 16 send device information to the cloud black box subsystem 20 using device information messages 24 that all use a common protocol or application programming interface (API). The device information stored in the cloud black box subsystem 20 is made available to cloud black box users 22.

As mentioned, the hosts 10 execute cloud-based applications used by the cloud infrastructure users 18, and these applications engage in application data storage accesses with the storage arrays 14 and engage in application network data transfers via the network switches 16. The hardware computing devices execute respective cloud black box agents (not shown in FIG. 1) that continually collect device information generated during operation of the respective hardware computing devices and generate the information messages 24 to send collected device information to the cloud black box subsystem 20. The cloud black box subsystem 20 preferably operates as independently of the applications and hardware computing devices as possible so as to be functional even in the event of the failure or disruption of any of the applications and hardware computing devices.

The cloud black box subsystem 20 serves a purpose analogous to the "black box" in aviation—when a critical event occurs, the cloud black box subsystem 20 can be used to reconstruct what happened leading up the event. Examples of such critical events include:
  Failure—such as loss of data
  Security breach
  Transitioning into a non-compliant state (e.g., with respect to security, privacy, performance, etc.)
Additionally, the cloud black box subsystem 20 can support other use cases such as the following:
  Collecting and keeping data to ensure and/or prove compliance
  Collecting and keeping data to troubleshoot problems short of critical events (such as aiding in break/fix and other support scenarios)
  Supporting "big data" analytics to reveal cloud operational insights, predict cloud service failures and detect security risks As described below, the cloud black box subsystem 20 can be realized in a variety of specific forms.

Figure 2:
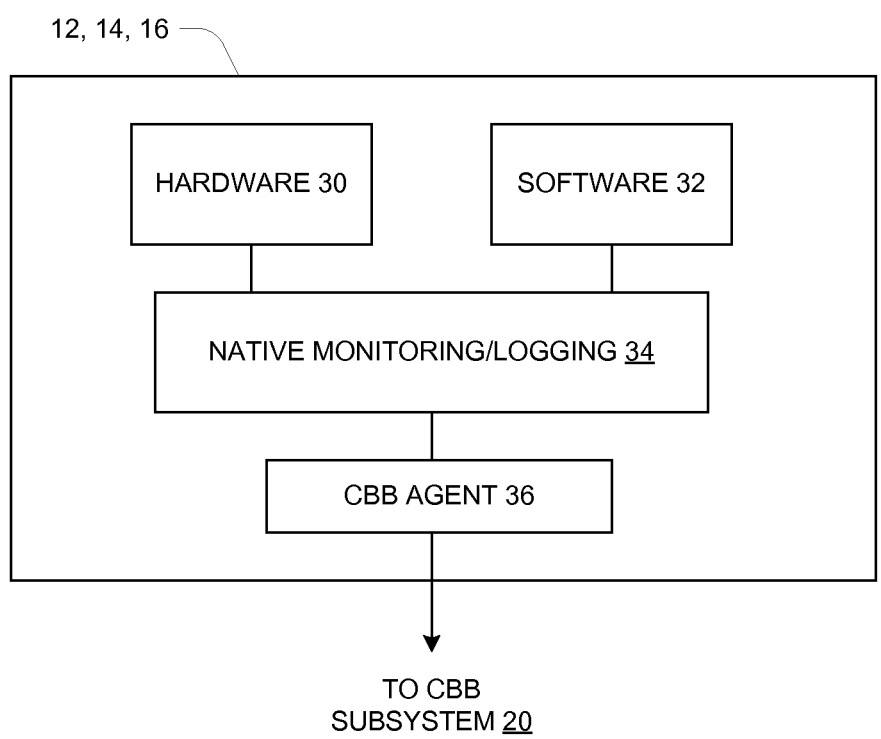
FIG. 2 is a block diagram of a hardware computing device.

FIG. 2 shows pertinent organization of a hardware computing device such as a host 12, array 14 or network switch 16. The device includes components or elements in the form of hardware 30 as well as software 32, with the nature of these components varying among the difference types of devices. A host 12, for example, is organized for execution of applications and may include significant processing and memory resources, as well as high-level user applications whose operation is visible to the cloud infrastructure users 18. An array 14 is organized for secondary storage capacity and data transfers using specialized storage-oriented hardware interfaces for example, and a network switch 16 is organized for high-throughput switching/routing of network traffic among sets of network ports that connect it to network links.

Generally, each type of device (12, 14 or 16) includes native monitoring and/or logging functionality 34 that captures information about the structure, configuration and operation of the device. A host 12, for example, may maintain a "registry" with a large collection of information about its hardware and software components, and may further execute one or more utilities that continually monitor aspects of operation and generate local log entries. As but one example, a network activity monitor might generate log entries for all network-related events, such as the creation, use and termination of network sessions, logins, etc. In another example, a process manager might generate log entries for all user and system processes and their pertinent characteristics and activities, such as memory usage, etc. The arrays 14 and network switches 16 include analogous native monitoring/logging functionality 34. In some cases the native monitoring/logging functionality of a given device may provide information to a separate entity, such as a management client accessing the device via a management server resident on the device. However, these interfaces are generally heterogeneous and device-specific. A distributed management application for a host 12, for example, does not obtain or process information from an array 14 or switch 16. Hence the term "native"—the native monitoring/logging 34 is typically device-type specific.

Each device 12, 14 and 16 also includes a cloud black box (CBB) agent 36 that serves as a bridge between the native monitoring/logging 34 and the cloud black box subsystem 20. The CBB agent gathers device information in whatever form it is maintained by the native monitoring/logging functionality 34 and sends the information to the cloud black box subsystem 20 using a common information delivery protocol. That is, within a given device type an agent 36 has a device-specific interface to the local monitoring/logging functionality 34, but across all device types the agents 36 provide the information to the cloud black box subsystem 20 using a single generic or common information delivery protocol in support of the system-wide logging function of the cloud black box subsystem 20.

Figure 3:
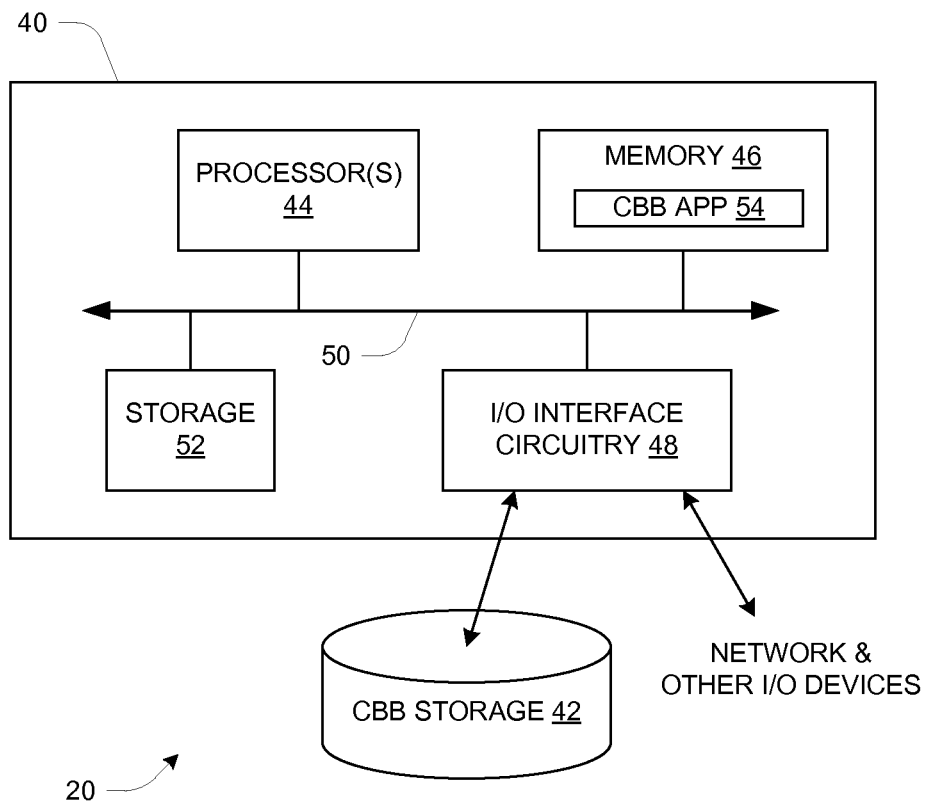
FIG. 3 is a block diagram of a cloud black box subsystem.

FIG. 3 shows an example configuration of the cloud black box subsystem 20. It generally includes one or more computers 40 and associated cloud black box (CBB) storage 42. A computer 40 from a hardware perspective include one or more processors 44, memory 46, and interface circuitry 48 interconnected by data interconnections 50 such as one or more high-speed data buses. The interface circuitry 48 provides a hardware connection to the cloud black box storage 42 and other external devices/connections (EXT DEVs). The processor(s) 44 with connected memory 46 may also be referred to as "processing circuitry" herein. A computer 40 may also include local storage 52 such as a local-attached disk drive or Flash drive. In operation, the memory 46 stores data and instructions of system software (e.g., operating system) and one or more application programs which are executed by the processor(s) 44 to cause the hardware to function in a software-defined manner. In this case a cloud black box application (CBB APP) 54 is shown. Thus the computer hardware executing instructions of the CBB application 54, can be referred to as a CBB circuit or CBB component, and it will be understood that a collection of such circuits or components can all be realized and interact with each other as one or more sets of computer processing hardware executing different computer programs as generally known in the art.

Other arrangements of the cloud black box subsystem 20 are possible as described below.

Figure 4:
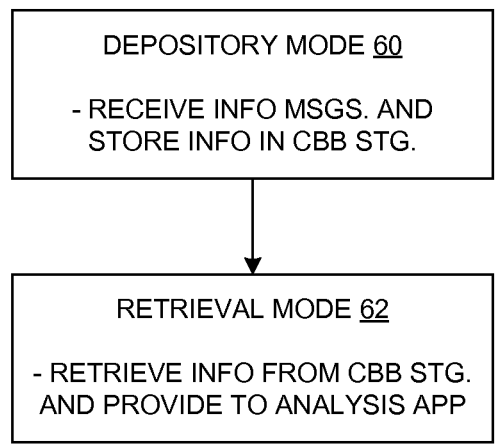
FIG. 4 is a high level flow diagram of operation of the cloud black box subsystem.

FIG. 4 shows operation of the cloud black box subsystem 20 at a high level. It has two modes or aspects of operation. In a depository mode 60, information messages 24 are continually received from the hardware computing devices (12, 14, 16) during normal operation of the cloud computing infrastructure 10, and device information from the information messages 24 is stored into the cloud black box storage 42. As described above, the information messages 24 are generated by respective cloud black box agents 36 executing on the hardware computing devices that continually collect the device information during operation of the respective hardware computing devices and generate the information messages 24 containing the device information according to a common information transfer protocol. The cloud black box subsystem 20 is also capable of operating in a second operating mode which is a "retrieval" mode 62 in which the device information in the cloud black box storage 42 is provided to a consumer of that information. Generally the consumer will be some form of data analysis application under the control of a cloud black box user 22 (FIG. 1). As noted, the cloud black box subsystem 20 preferably operates independently of the applications and hardware computing devices so as to be functional in the retrieval mode in the event of the failure or disruption of any of the applications and hardware computing devices.

In one type of use, the two operating modes 60 and 62 may be non-concurrent. The cloud black box subsystem 20 operates in the depository mode 60 essentially indefinitely, and may only transition into the retrieval mode 62 based on some significant event, such as failure of some significant part of the cloud infrastructure. This transition may be automatic or it may be initiated externally, such as by an administrative cloud black box user 22 commanding the transition. In other uses the two modes may be partly or wholly concurrent, such that the cloud black box subsystem 20 can continue to receive logging messages 24 and store new device information in the cloud black box storage 42 while at the same time providing stored information to cloud black box users 22.

Additionally, the data analysis application that receives information retrieved from the cloud black box storage 42 may be executing on a separate computer or it may be executing in the computer(s) 40 of the cloud black box subsystem 20. In the former case, the cloud black box subsystem 20 provides a data retrieval API, which may be a so-called "RESTful" API of the general type known in the art. In the latter case, the data analysis application may provide a graphical or command-line user interface to the external cloud black box users 22.

Returning to the depository mode 60, the cloud black box subsystem 20—whether implemented as physical or virtualized entity—is reachable via an API that is accessible by all systems and devices in the cloud 10. The API enables at a minimum the following functions:

Log a message

Specification of logging includes log patterns and log API, and messages may specify things such as severity level, message catalogs as desired, high level and detailed log information, etc.

Deposit a blob of data

This can be anything the entity using the API needs to store. This can include configuration information packages, data for further analysis, etc.

Raise a critical alert

This API can be realized in one or multiple ways, such as a RESTful API, or through C++ or Java language bindings. The API can be supported by a service to get an address a "lockbox" in the cloud black box subsystem 20 for storing critical information A protocol is established that sets guidelines on what information the cloud entities should log to the black box service. This includes the following:

Guidelines on use of the severity values

Best practices and examples of what to log and how. Since cloud system participants may be from multiple vendors, adherence to the protocol can become a requirement for the systems that implement the cloud The cloud black box subsystem 20 may apply filtering to improve the efficiency of information storage. For example, it may look for patterns of what the cloud entities want to log, and filter out noisy loggers.

To support a large volume of writes the cloud black box subsystem 20 can be implemented using tiered storage and automatically relocate old (cold) logs to low performing disks while keeping newer logs and "hot" (actively accessed) data on high performing disks (such as flash drives) to support real time analysis.

Figure 5:
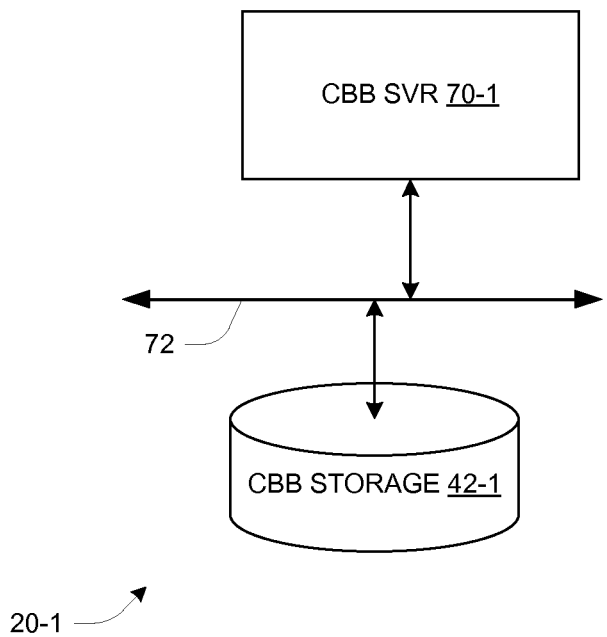
FIGS. 5 and 6 are block diagrams of a cloud black box subsystem according to alternative embodiments.
Figure 6:
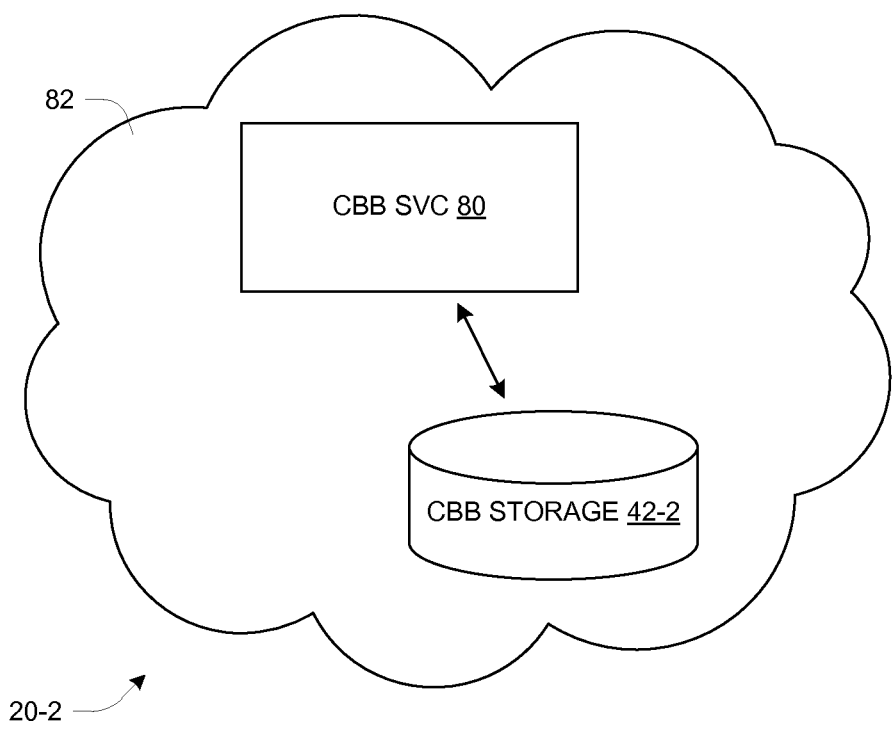

FIGS. 5 and 6 show alternative implementations of the cloud black box subsystem 20 Returning briefly to FIG. 3, in the illustrated configuration the cloud black box subsystem 20 is realized as a physical entity of a first type, namely as a computer system with its own CPU and storage, that is accessible from all systems in the cloud. FIG. 5 shows a second type of physical implementation 20-1, namely as physical storage 42-1 (such as a small NAS storage system) mounted to a physical server 70-1 and linked thereto by network communications link 72. FIG. 6 shows a virtualized implementation 20-2 having a virtual service 80 running in a cloud 82 with storage 42-2 somewhere in the cloud 82. The cloud 82 may be part of the cloud infrastructure 10 or a separate cloud.

Figure 7:
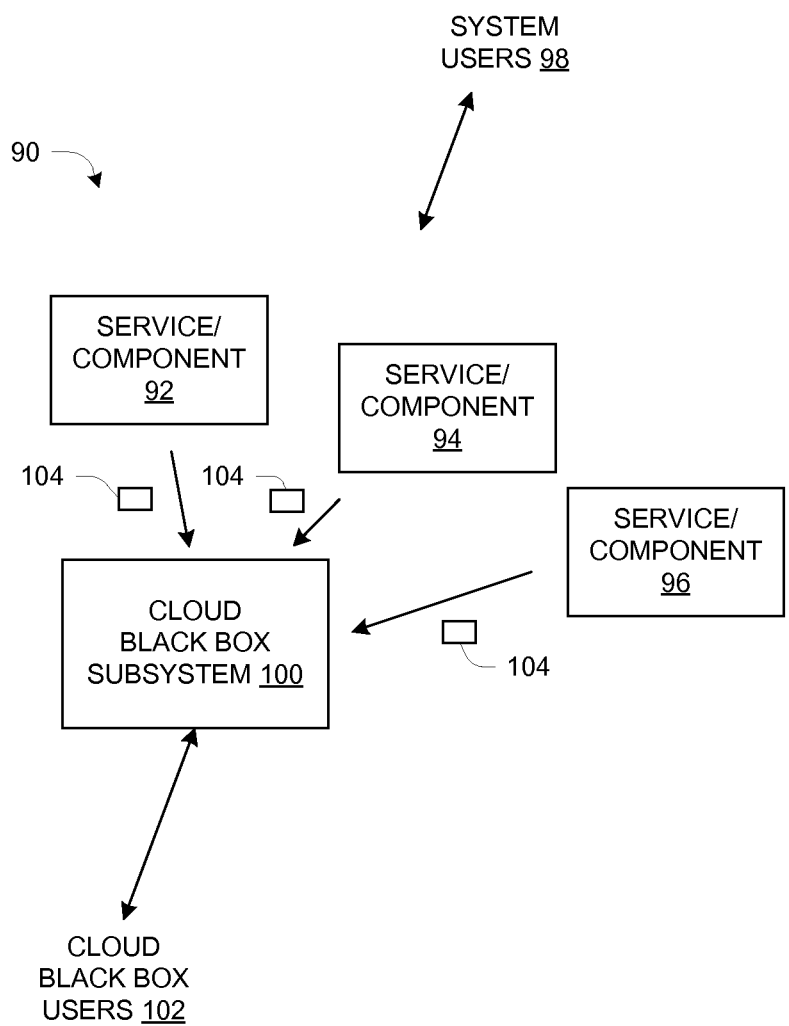
FIG. 7 is a schematic block diagram of a computing system also including a cloud black box subsystem.

FIG. 7 shows a more generalized application to a system 90 having a set of discrete, heterogeneous services or components 92, 94, 96. The system 90 could be a software system, for example, and the services/components 92, 94 and 96 could be instances of functional software modules/programs executing on one or more computers, providing services to service users 98. The cloud black box subsystem 100 operates similar to as described above, storing service/component information reported in information messages 104 and making the stored information available to cloud black box users 102.

While various embodiments of the invention have been particularly shown and described, it will be understood by those skilled in the art that various changes in form and details may be made therein without departing from the spirit and scope of the invention as defined by the appended claims.

What is claimed is:

1. A cloud black box subsystem for use in a cloud computing infrastructure having a set of network-connected hardware computing devices including host computers, storage arrays and network switches, the host computers being operative to execute one or more applications of a cloud infrastructure user, the applications engaging in application data storage accesses with the storage arrays and engaging in application network data transfers via the network switches, comprising:

cloud black box storage; and computer processing circuitry operative to execute a cloud black box application having first and second operating modes, the first operating mode being a depository mode in which information messages are continually received from the hardware computing devices during normal operation of the cloud computing infrastructure and device information from the information messages is stored into the cloud black box storage, the information messages generated by respective cloud black box agents executing on the hardware computing devices and continually operative to collect the device information during operation of the respective hardware computing devices and to generate the information messages containing the device information according to a common information transfer protocol, the second operating mode being a retrieval mode in which the device information in the cloud black box storage is provided to a data analysis application, the cloud black box subsystem operating independently of the applications and hardware computing devices so as to be functional in the retrieval mode in an event of failure or disruption of any of the applications and hardware computing devices.

2. A cloud black box subsystem according to claim 1, realized as a distinct physical computing system having one or more physical enclosures housing physical computing elements dedicated to the cloud black box subsystem.

3. A cloud black box subsystem according to claim 2, wherein the cloud black box subsystem is realized as one or more network attached storage (NAS) storage nodes mounted to one or more physical cloud black box server computers.

4. A cloud black box subsystem according to claim 2, wherein the cloud black box subsystem is realized as one or more cloud black box host computers having local physical storage.

5. A cloud black box subsystem according to claim 1, realized as in a virtualized manner including a virtual service executing in a computing cloud and having storage in the computing cloud.

6. A cloud black box subsystem according to claim 1, wherein the common information transfer protocol is defined by an application programming interface (API) exported by the cloud black box subsystem that provides functions of (i) logging a message, (ii) depositing a blob of data, and (iii) raising an alert.

7. A cloud black box subsystem according to claim 6, wherein the API reflects predetermined guidelines for logging device information.

8. A cloud black box subsystem according to claim 1, operative in the depository mode to apply filtering to the device information received in the information messages to improve efficiency of storage of the device information.

9. A cloud black box subsystem according to claim 1, wherein the cloud black box storage employs tiered storage having at least two levels, a first level providing fast access to current and frequently accessed device information, and a second level providing high-capacity storage of older and infrequently accessed device information.

10. A cloud black box subsystem according to claim 1, wherein the data analysis application is executed remotely in a separate computer system and the cloud black box subsystem exports a retrieval application programming interface (API) to provide access to the stored device information by the remote data analysis application.

11. A cloud black box subsystem according to claim 1, wherein the data analysis application is executed locally in the cloud black box subsystem and exports a user interface to the cloud black box users.

12. A non-transitory computer-readable medium storing computer program instructions, the instructions being executable as a cloud black box application by a set of one or more computers to cause the computers to form, along with cloud black box storage, a cloud black box subsystem for use in a cloud computing infrastructure having a set of network-connected hardware computing devices including host computers, storage arrays and network switches, the host computers being operative to execute one or more applications of a cloud infrastructure user, the applications engaging in application data storage accesses with the storage arrays and engaging in application network data transfers via the network switches, the cloud black box subsystem performing a method including:

a first operating mode being a depository mode in which information messages are continually received from the hardware computing devices during normal operation of the cloud computing infrastructure and device information from the information messages is stored into the cloud black box storage, the information messages generated by respective cloud black box agents executing on the hardware computing devices and continually operative to collect the device information during operation of the respective hardware computing devices and to generate the information messages containing the device information according to a common information transfer protocol; and a second operating mode being a retrieval mode in which the device information in the cloud black box storage is provided to a data analysis application, the cloud black box subsystem operating independently of the applications and hardware computing devices so as to be functional in the retrieval mode in an event of failure or disruption of any of the applications and hardware computing devices.

13. A non-transitory computer-readable medium according to claim 12, wherein the common information transfer protocol is defined by an application programming interface (API) exported by the cloud black box subsystem that provides functions of (i) logging a message, (ii) depositing a blob of data, and (iii) raising an alert.

14. A non-transitory computer-readable medium according to claim 13, wherein the API reflects predetermined guidelines for logging device information.

15. A non-transitory computer-readable medium according to claim 12, wherein the depository mode includes applying filtering to the device information received in the information messages to improve efficiency of storage of the device information.

16. A non-transitory computer-readable medium according to claim 12, wherein the cloud black box storage employs tiered storage having at least two levels, a first level providing fast access to current and frequently accessed device information, and a second level providing high-capacity storage of older and infrequently accessed device information.

17. A non-transitory computer-readable medium according to claim 12, wherein the data analysis application is executed remotely in a separate computer system and the cloud black box subsystem exports a retrieval API to provide access to the stored device information by the remote data analysis application.

18. A non-transitory computer-readable medium according to claim 12, wherein the data analysis application is executed locally in the cloud black box subsystem and exports a user interface to the cloud black box users.

19. A cloud computing infrastructure, comprising:

a set of network-connected hardware computing devices including host computers, storage arrays and network switches, the host computers operative to execute one or more applications of a cloud infrastructure user, the applications engaging in application data storage accesses with the storage arrays and engaging in application network data transfers via the network switches, the hardware computing devices executing respective cloud black box agents continually operative to collect device information generated during operation of the respective hardware computing devices and to generate information messages containing the device information according to common information transfer protocol; and a cloud black box subsystem coupled to the network-connected hardware computing devices, the cloud black box subsystem including cloud black box storage and having first and second operating modes, the first operating mode being a depository mode in which the information messages are continually received from the hardware computing devices during normal operation of the cloud computing infrastructure and the device information from the information messages is stored into the cloud black box storage, the second operating mode being a retrieval mode in which the device information in the cloud black box storage is provided to a data analysis application, the cloud black box subsystem operating independently of the applications and hardware computing devices so as to be functional in the retrieval mode in an event of failure or disruption of any of the applications and hardware computing devices.

20. A cloud black box subsystem for use in a computing system having a set of discrete, heterogeneous functional components interoperating to provide a system-level service, comprising:

cloud black box storage; and computer processing circuitry operative to execute a cloud black box application having first and second operating modes, the first operating mode being a depository mode in which information messages are continually received from the functional components during normal operation of the computing system and component information from the information messages is stored into the cloud black box storage, the information messages generated by respective cloud black box agents executing in association with the functional components and continually operative to collect the component information during operation and to generate the information messages containing the component information according to a common information transfer protocol, the second operating mode being a retrieval mode in which the component information in the cloud black box storage is provided to a data analysis application, the cloud black box subsystem operating independently of the components so as to be functional in the retrieval mode in an event of failure or disruption of any of the components.

\* \* \* \* \*